United States Patent
Shiba

(10) Patent No.: US 8,875,123 B2
(45) Date of Patent: Oct. 28, 2014

(54) VEHICLE-MOUNTED SOFTWARE UPDATING APPARATUS

(75) Inventor: Hisanori Shiba, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 546 days.

(21) Appl. No.: 13/218,107

(22) Filed: Aug. 25, 2011

(65) Prior Publication Data

US 2011/0307882 A1 Dec. 15, 2011

Related U.S. Application Data

(63) Continuation of application No. PCT/JP2009/068835, filed on Nov. 4, 2009.

(30) Foreign Application Priority Data

Mar. 31, 2009 (JP) ................. 2009-087419

(51) Int. Cl.
  *G06F 9/44* (2006.01)
  *G06F 9/445* (2006.01)
  *H04L 29/08* (2006.01)
(52) U.S. Cl.
  CPC ............. *G06F 8/65* (2013.01); *H04L 29/08981* (2013.01); *G06F 8/61* (2013.01)
  USPC ........................................................ 717/173
(58) Field of Classification Search
  CPC ..................................... G06F 8/65; G06F 8/61
  See application file for complete search history.

(56) References Cited

U.S. PATENT DOCUMENTS

| | | | | |
|---|---|---|---|---|
| 6,647,322 B1* | 11/2003 | Hayashi et al. | ................. | 701/1 |
| 8,065,673 B2* | 11/2011 | D'Souza et al. | ............... | 717/173 |
| 2008/0148268 A1* | 6/2008 | Hirouchi | ........................ | 718/103 |
| 2009/0300595 A1* | 12/2009 | Moran et al. | ................... | 717/170 |
| 2010/0082559 A1* | 4/2010 | Sumcad et al. | ............... | 707/695 |

FOREIGN PATENT DOCUMENTS

| | | |
|---|---|---|
| JP | A-10-333914 | 12/1998 |
| JP | A-2000-207219 | 7/2000 |
| JP | A-2004-210183 | 7/2004 |
| JP | A-2008-152482 | 7/2008 |
| JP | B2-4147946 | 9/2008 |
| JP | B2-4286633 | 7/2009 |

OTHER PUBLICATIONS

International Preliminary Report on Patentability mailed on Feb. 7, 2011 issued in International Patent Application No. PCT/JP2009/068835(with translation).
International Search Report cited in International Application No. PCT/JP2009/068835 dated Feb. 9, 2010 (with translation).

* cited by examiner

*Primary Examiner* — Anna Deng
(74) *Attorney, Agent, or Firm* — Oliff PLC

(57) ABSTRACT

A vehicle-mounted software updating apparatus for performing a software update by downloading software from outside a vehicle includes a storage unit storing a past on/off status of an accessory (ACC); a software update period determining unit determining a software update period in which software update is to be performed based on information in the storage unit such that the software update is performed in an ACC-off period; and a software update performing unit performing the software update in the software update period determined by the software update period determining unit.

5 Claims, 4 Drawing Sheets

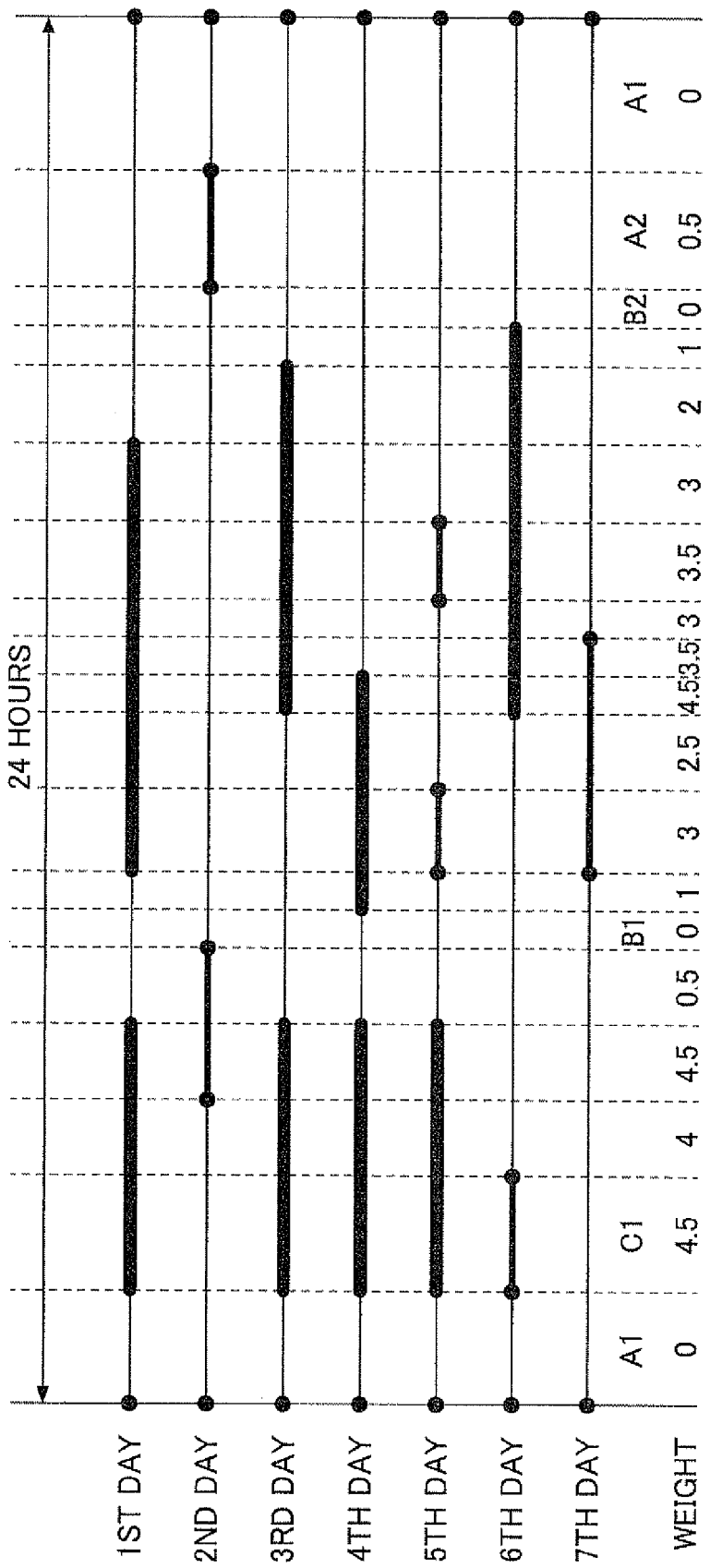

VEHICLE-MOUNTED SOFTWARE UPDATING APPARATUS

CROSS-REFERENCE TO RELATED APPLICATION

This application is a U.S. continuation application filed under 35 USC 111(a) claiming benefit under 35 USC 120 and 365(c) of PCT application JP2009/068835, filed Nov. 4, 2009. The foregoing application is hereby incorporated herein by reference.

BACKGROUND OF THE INVENTION

1. Field of the Invention

The present invention relates to a vehicle-mounted software updating apparatus for performing a software update by downloading software from outside a vehicle.

2. Description of the Related Art

Conventionally, in an apparatus of the aforementioned type, a technology is known whereby it is determined whether the time at which an ignition (IG) switch was turned off is in a predetermined time band (such as a time band in which the use of the vehicle is completed for the last time in the day). When the time is in the predetermined time band, operation of an operation unit for acquiring map data, for example, from an external server via wireless communication is permitted. When the time is outside the predetermined time band, operation of the operation unit is prohibited (see JP Patent No. 4147946 ("Patent Document 1"), for example).

However, the time band of use of the vehicle may vary depending on the user. Thus, in a configuration in which a predetermined time band is set for a software update (as in Patent Document 1), a software updating process may not be performed if the user uses the vehicle frequently in the predetermined time band.

Thus, it is an object of the present invention to provide a vehicle-mounted software updating apparatus that can perform a software update in consideration of users who may use the vehicle in different time bands.

SUMMARY OF THE INVENTION

In one aspect of the present invention, a vehicle-mounted software updating apparatus for performing a software update by downloading software from outside a vehicle includes a storage unit configured to store a past on/off status of an accessory (ACC); a software update period determining unit configured to estimate an optimum period having a high probability of the ACC being off based on information stored in the storage unit, configured to determine whether the estimated optimum period is longer than a required download time necessary for a software update, and configured to determine a software update period within the estimated optimum period when it is determined that the estimated optimum period is longer than the required download time necessary for the software update; and a software update performing unit configured to perform the software update in the software update period determined by the software update period determining unit.

BRIEF DESCRIPTION OF THE DRAWINGS

FIG. 4 illustrates several methods of estimating the optimum period with the high probability of the ACC being off.

DETAILED DESCRIPTION OF THE PREFERRED EMBODIMENTS

In the following, embodiments of the present invention are described with reference to the drawings.

Figure 1:
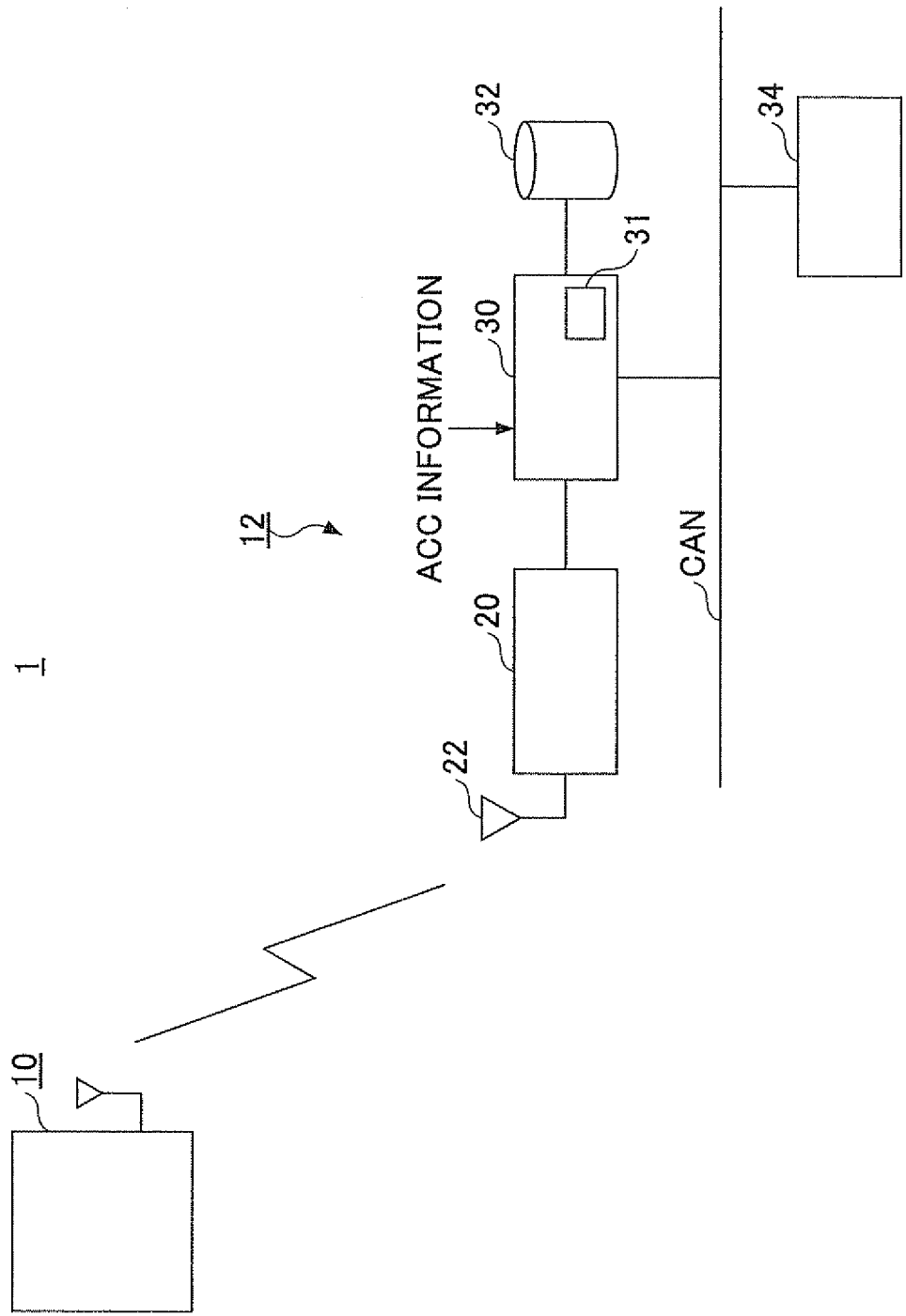
FIG. 1 illustrates an overall structure of a system 1 in which a vehicle-mounted software updating apparatus according to an embodiment of the present invention is applied.

FIG. 1 illustrates an overall structure of a system 1 in which a vehicle-mounted software updating apparatus 12 according to an embodiment of the present invention is applied. The system 1 includes a server 10 disposed outside a vehicle, and a vehicle-mounted software updating apparatus 12.

The server 10, as will be described later, supplies software updating data to the vehicle-mounted software updating apparatus 12 via wireless communication. The server 10 may include any type of service provider (xSP). The server 10 may supply the software updating data to the vehicle-mounted software updating apparatus 12 via an arbitrary route, such as a route from a TSP (telematics service provider) via a cell phone carrier network, or a route from a TSP via the Internet and a hot spot.

The vehicle-mounted software updating apparatus 12 is mounted on the vehicle. In the present embodiment, the vehicle-mounted software updating apparatus 12 includes a communication module 20 and a vehicle-mounted ECU 30.

The communication module 20 communicates with the server 10 by transmitting and receiving radio waves via a vehicle-mounted antenna 22. The communication module 20 may include a vehicle-mounted telephone. The present embodiment may be particularly suitable when the vehicle-mounted telephone is not of a type, such as a cell phone, that can be brought out of the vehicle for a normal mode of use.

The vehicle-mounted ECU 30 may include hardware units such as a CPU, a ROM storing a program for realizing various functions which will be described below are stored, a RAM storing operation results and the like, a timer, a counter, an input interface, and an output interface. The vehicle-mounted ECU 30 includes a rewritable memory 31 and an auxiliary storage apparatus 32, such as a hard disk drive. The memory 31 stores history data as will be described below. The memory 31 may be shared with the auxiliary storage apparatus 32. The vehicle-mounted ECU 30 may include an ECU for a vehicle-mounted navigation system, or a diagnostic ECU for exchanging diagnostic information and the like with a server (center), or any other ECU. The vehicle-mounted ECU 30 may include a dedicated ECU that is newly set.

The vehicle-mounted ECU 30 may be connected to another ECU 34 in the vehicle via an appropriate bus, such as a CAN (controller area network). The other ECU 34 may include an arbitrary ECU. In the present embodiment, the ECU 34 is assumed to require an update of software.

The vehicle-mounted ECU 30 according to the present embodiment stores on/off history data of an accessory (ACC) of the vehicle in the memory 31 based on information (ACC information) indicating an on/off status of the accessory. The ACC on/off history data may include data of only a predetermined number of days, based on a FIFO system. The ACC information may be acquired based on the status of various power lines (such as an IG (ignition) line or an ACC line) connected to the accessory, or from other information sources (such as another ECU or an engine switch signal). It goes without saying that an ACC-on status may include an IG-on status.

Figure 2:
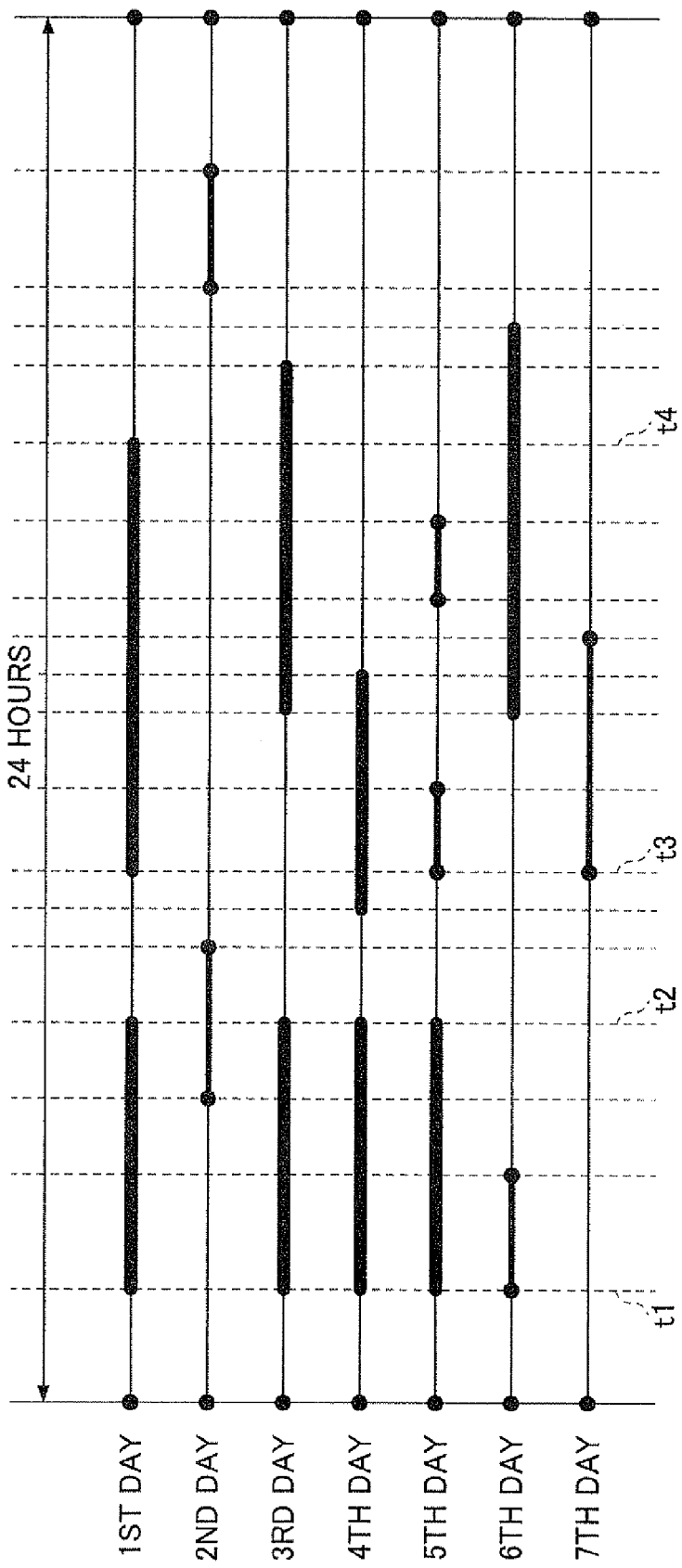
FIG. 2 illustrates an example of ACC on/off history data stored by a vehicle-mounted ECU.

FIG. 2 illustrates an example of the ACC on/off history data stored in the vehicle-mounted ECU 30. In the example of FIG. 2, the history data of seven days (a week) is stored. In FIG. 2, the horizontal axis is a time axis indicating the twenty-four hours of a day. The intervals of the thick lines indicate periods in which the ACC on-time continued for 30 minutes or more. The intervals of the thin lines indicate the periods in which the ACC on-time continued for less than 30 minutes. Thus, preferably, the vehicle-mounted ECU 30 stores information indicating whether the ACC on-time continued for a predetermined time (which is 30 minutes in the present example) or more in association with the corresponding time periods. In this way, the case where the ACC is turned on not for driving the vehicle or for driving the vehicle only for a short time can be distinguished from the case where the ACC is turned on for driving the vehicle for a long time, so that a software update timing can be determined in consideration of these different cases, as will be described below.

Figure 3:
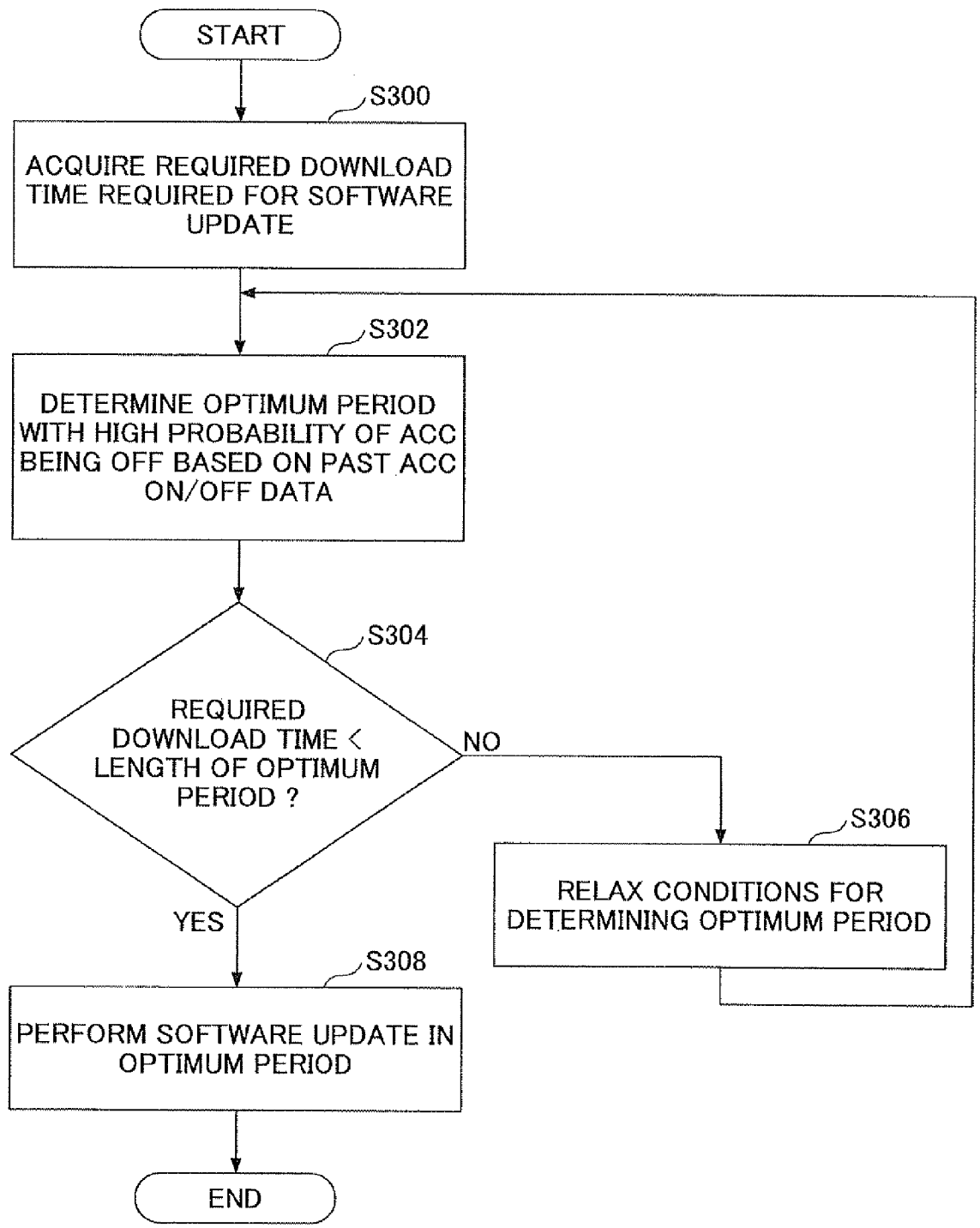
FIG. 3 is a flowchart of a main process performed the vehicle-mounted software updating apparatus according to the present embodiment.

FIG. 3 is a flowchart of a main process performed by the vehicle-mounted software updating apparatus 12 according to the present embodiment. The process of FIG. 3 may be started and executed upon generation of a software update request. The software to be updated may include any type of software. Typically, the software to be updated may include software to be upgraded. The software to be updated may include data such as navigation system map data or music data. A software update request may be made upon request from the server 10 or in response to an input from a user (such as an input via an interactive interface.

In step 300, the communication module 20 acquires information from the server 10 indicating a required download time required to complete a software update. The information may include information of the required download time itself, or information that indirectly indicates the required download time, such as a data amount. Preferably, the information may be supplied to the vehicle-mounted software updating apparatus 12 in advance at the time of a software update request (or guidance) from the server 10. In this case, step 300 may be omitted.

In step 302, the vehicle-mounted ECU 30 estimates an optimum period in which the probability that the ACC is off is high, based on the ACC on/off history data. The optimum period is a period within the 24 hours of the day, such as 6-11 p.m. The optimum period may span multiple days, such as from 11 p.m. one day to 5 a.m. the following day. The method of estimating the optimum period with the high probability of the ACC being off based on the ACC on/off history data is not particularly limited and may be selected depending on the required accuracy or calculation load.

With reference to FIG. 4, several examples of the estimating method that may be used in step 302 are described.

A simplest estimating method (which may be hereafter referred to as "a first estimating method") may extract the period in which the ACC was off in all of the days based on the ACC on/off history data. For example, in the case of FIG. 4, periods B1, B2, and A1 are extracted, of which the longest period A1 is estimated to be the optimum period with the high probability of the ACC being off. In the illustrated example of FIG. 4, the period A1 may span the days from 11 p.m. one day past midnight (extreme right) to 5 a.m. the following day (in the left intervals).

In another preferable estimating method (which may be hereafter referred to as "a second estimating method), as illustrated in the bottom of FIG. 4, the periods in which the ACC on-time continued for a predetermined time (which is 30 minutes in the illustrated example) or more, the periods in which the ACC on-time continued for less than the predetermined time, and the periods in which the ACC on-time was zero, are all allocated different weights. A total of the weights of the days is calculated for each of the time periods within the 24 hours, and the total weights are compared among the periods. For example, in the example of FIG. 4, the periods in which the ACC on-time continued for the predetermined time (30 minutes in the present example) or more, the periods in which the ACC on-time continued for less than the predetermined time, and the periods in which the ACC on-time was zero, are allocated the weights of "1", "0.5", and "0", respectively. For example in a period C1, the ACC on-time continued for the predetermined time or more in the first, third, fourth, and fifth days, while the ACC on-time was less than the predetermined time (and more than zero) in the sixth day. Thus, the total of the weights for the period C1 is "4.5". In this way, the total weight is calculated for each of the periods within the 24 hours, and the period with the minimum total weight is estimated to be the optimum period having the high probability the ACC being off.

In a variation of the second estimating method (which may be hereafter referred to as a "third estimating method"), the periods within the 24 hours are fixed at regular intervals (such as at 1-hour intervals for a total of 24 periods). The total weight is similarly calculated for each of the periods, and the period with the smallest total weight is estimated to be the optimum period with the high probability of the ACC being off. In the third estimating method, as opposed to the second estimating method, there may be a case where a period includes both a period in which the ACC on-time continued for the predetermined time (such as 30 minutes in the present example) or more and a period in which the ACC on-time was zero. In such a case, the weight for the corresponding period (one hour) may be determined by the ratio of the period in which the ACC on-time continued for the predetermined time or more. For example, when the period in which the ACC on-time continued for the predetermined time or more is 40 minutes, the weight is calculated by 1×40/60. In the third estimating method, too, the period (one hour period) with the smallest total weight, or two or more adjacent periods with the smallest total weight may be estimated to be the optimum period with the high probability of the ACC being off.

In a variation of the third estimating method (which may be hereafter referred to as a "fourth estimating method"), a search window of a predetermined time is set, and a period with the smallest total weight calculated as described above may be searched for from the period (within 24 hours) in the search window while the search window is moved along the horizontal axis. The width (or steps) of movement of the search window may be determined in view of the calculation load, and may be determined to be a width corresponding to 30 minutes. Alternatively, the width may be determined by the size of the search window. For example, the width may be one half the size of the search window. The size (period) of the search window may be determined by the required download time acquired in step 300 which is required for software update. The size of the search window may be set by adding a predetermined margin to the required download time. When the fourth estimating method is adopted, the process of step 304 which will be described below may be omitted. In this case, the routine may skip to step 308 from step 302.

In step 304, the vehicle-mounted ECU 30 determines whether the optimum period (with the high probability of the ACC being off) obtained in step 302 is longer than the required download time (i.e., the required download time required for a software update) acquired in step 300. In this case, too, it may be determined whether the optimum period is longer than the required download time to which a margin α is add. When the optimum period is longer than the required download time, it is determined that the software can be updated within the optimum period, and the routine proceeds to step 308. When the optimum period is shorter than the required download time, it is determined that the software cannot be updated within the optimum period, and the routine proceeds to step 306.

In step 306, the vehicle-mounted ECU 30 again searches for a time band that enables download by relaxing or modifying the conditions for determining the optimum period. For example, when in step 302 the optimum period is estimated by the first estimating method, the conditions may be relaxed such that the optimum period may include a total weight of "0.5". For example, in the case of FIG. 4, the period A1 to which at least a part of the period A2 is added may be estimated to be the optimum period. Alternatively, when the optimum period was estimated in step 302 by the first estimating method, the optimum period may be estimated again by the fourth estimating method. Further alternatively, when an upper threshold is set for the total weight in the case of any of the first through third estimating methods, the optimum period longer than the required download time may be estimated by relaxing the upper threshold.

In step 308, the vehicle-mounted ECU 30 sets a software update period within the optimum period estimated as described above. Upon detection of a start time of the software update period, a download process is started, whereby update software is downloaded via the communication module 20 from the server 10. Preferably, the software update period may not necessarily start from the start time of the optimum period, and may start after the start time of the optimum period as long as the software update period can remain within the optimum period.

In this step 308, the essential condition for starting the download process is that the ACC is off at that point in time. During the execution of download, a communicating status between the communication module 20 and the server 10 is maintained, so that the communication module 20 cannot perform other communications in principle. However, in the present embodiment, as described above, the optimum period is the period estimated to be the period with the high probability of the ACC being off. Thus, the probability is low that the user may turn on the ACC and make it necessary to perform another communication. Preferably, in the event that the ACC is turned on during a software update, a message such as "Software updating. Please turn on IG again X minutes later" may be produced on a vehicle-mounted display (not illustrated), thus prompting the user to turn IG-on later. In this case, the value of "X" may be determined based on a difference between the required download time acquired in step 300 and the executed time of the ongoing download. Such a message may be output only when the value of X is short (such as 5 minutes), and the software update process may be terminated or interrupted when the value of X is large.

In step 308, the update software downloaded from the server 10 is stored in the auxiliary storage apparatus 32 of the vehicle-mounted ECU 30 (at this stage, the "software update" has been substantially realized). Thereafter, when in an IG-on status, software of the other ECU 34 may be rewritten (updated) based on the data in the auxiliary storage apparatus 32. Alternatively, the software of the other ECU 34 may be updated directly by the data from the server 10 in step 308, i.e., when the ACC is off.

The vehicle-mounted software updating apparatus 12 according to the foregoing embodiment provides the following advantageous effects, among others.

As described above, the optimum period with the high probability of the ACC being off is estimated based on the ACC on/off history data, and a software update is executed in the estimated optimum period. Thus, the software update can be realized utilizing an appropriate time band adapted to the tendency of the ACC on/off period, which may vary depending on the user. Namely, the software update period can be set within a period in which the user is not driving the vehicle in accordance with his or her life rhythm. Thus, an accurate and quick software update process can be realized.

Although this invention has been described in detail with reference to certain embodiments, variations and modifications exist within the scope and spirit of the invention as described and defined in the following claims.

For example, while in the foregoing embodiment the software update is performed by downloading software from the server 10 installed outside the vehicle via wireless communication, the wireless communication is merely an example. Preferably, a wired communication technology such as a LAN or PLC (Power Line Communication) may be used. For example, in the case of a plug-in hybrid vehicle, a software update may be performed by downloading software from the server 10 via PLC while the vehicle is connected to a power supply via a charging cord. An embodiment of the present invention may be applied to such a mode of a software update. Further, a software update may be performed by connecting a dedicated tool used at a dealer's shop and the like to a vehicle-mounted LAN, so that software can be downloaded via the dedicated tool. An embodiment of the present invention may be applied to such a mode of software update.

Further, while in the foregoing embodiment the vehicle-mounted ECU 30 and the communication module 20 are provided by separate units, a function of the vehicle-mounted ECU 30 may be incorporated into the communication module 20. Specifically, the function of the vehicle-mounted ECU 30 may be realized by a control apparatus (such as an ECU) included in the communication module 20.

In the foregoing embodiment, the optimum period with the high probability of the ACC being off is estimated based on the history data of the past seven days starting from the current day (today). However, this is merely an example. Preferably, the optimum period with the high probability of the ACC being off may be estimated based on the history data of a predetermined number of the same days of the week as the current day (today), in consideration of the possible variations of the tendency of the ACC on/off period depending on the day of the week. Alternatively, from a similar viewpoint, i.e., considering the variations in the tendency between weekends (such as Saturday, Sunday, and national holiday) and weekdays, the optimum period with the high probability of the ACC being off may be estimated based on the history data of a predetermined number of days of weekend when the current day (today) is weekend. When the current day (today) is a weekday, the optimum period with the high probability of the ACC being off may be estimated based on the history data of a predetermined number of weekdays.

In the foregoing embodiment, the longer the time the ACC is on, the greater the weight that is allocated. It goes without saying that, conversely, smaller weights may be allocated as the time the ACC is on increases. In this case, a period with a greater weight may be preferentially utilized for software update.

Thus, in accordance with an embodiment of the present invention, a vehicle-mounted software updating apparatus capable of performing a software update in consideration of users who use a vehicle in different time bands is provided.

What is claimed is:

1. A vehicle-mounted software updating apparatus for performing a software update by downloading software from outside a vehicle, the vehicle-mounted software updating apparatus comprising:
   a storage unit configured to store a past on/off status of an accessory (ACC);
   a software update period determining unit configured to estimate an optimum period having a high probability of the ACC being off based on information stored in the storage unit, configured to determine whether the estimated optimum period is longer than a required download time necessary for a software update, and configured to determine a software update period within the estimated optimum period when it is determined that the estimated optimum period is longer than the required download time necessary for the software update; and
   a software update performing unit configured to perform the software update in the software update period determined by the software update period determining unit
   wherein the software update period determining unit is further configured to:
   estimate an optimum period within 24 hours having a high probability of the ACC being off based on information of a predetermined number of days in the past that is stored in the storage unit and determine the software update period based on the estimated period
   allocate a first weight, a second weight, and a third weight to a period in which the ACC was on continuously for a predetermined time or more, a period in which the ACC was on continuously for less than the predetermined time, and a period in which the ACC was not on, respectively,
   calculate a total of the weights of the predetermined number of days for each of the periods in the 24 hours, and
   estimate the optimum period with the high probability of the ACC being off by comparing the total weights among the periods.

2. The vehicle-mounted software updating apparatus according to claim 1, wherein the software update is performed by downloading the software from a server disposed outside the vehicle via wireless communication.

3. The vehicle-mounted software updating apparatus according to claim 1, wherein the software update period determining unit estimates a period in which the ACC was off in all of the predetermined number of days in the past, and determines the estimated period as being the optimum period with a high probability of the ACC being off.

4. The vehicle-mounted software updating apparatus according to claim 1, wherein the predetermined number of days in the past include seven consecutive days before a current day.

5. The vehicle-mounted software updating apparatus according to claim 1, wherein the predetermined number of days in the past includes a predetermined number of the same days of the week as a current day.

* * * * *